Jan. 15, 1957   R. CHAMBERLAIN ET AL   2,777,482
LIMBING ATTACHMENT FOR POWER DRIVEN CHAIN SAWS
Filed Feb. 24, 1953
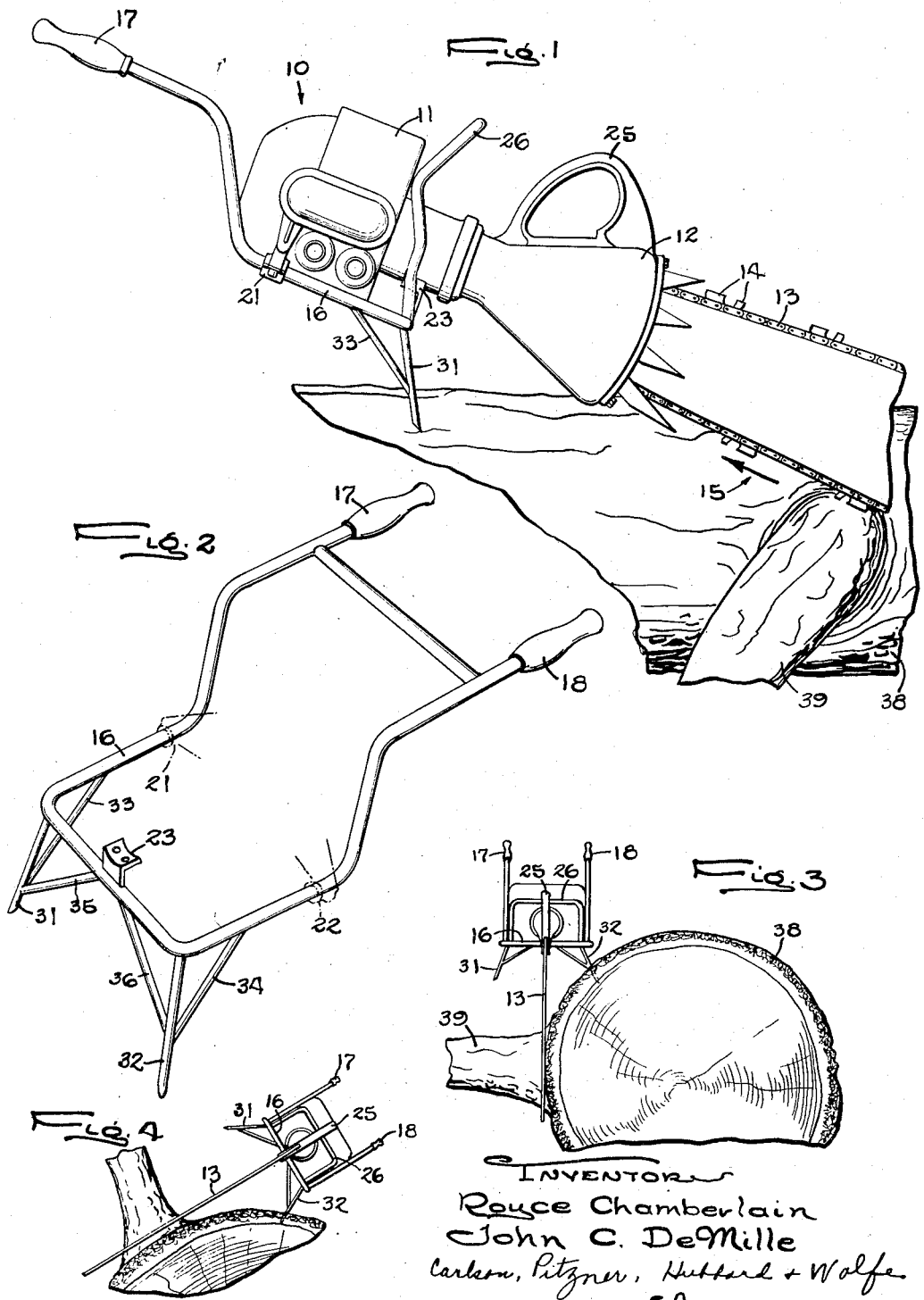

United States Patent Office 2,777,482
Patented Jan. 15, 1957

2,777,482
LIMBING ATTACHMENT FOR POWER DRIVEN CHAIN SAWS

Royce Chamberlain and John C. De Mille, Orderville, Utah

Application February 24, 1953, Serial No. 338,194

2 Claims. (Cl. 143—32)

It is an object of the present invention to provide a power driven saw which may be used for the trimming of trees as well as felling and bucking. It is another object to provide a power driven saw which is capable of performing all normal sawing operations thereby eliminating the need of special purpose saws and which is capable of trimming branches of any size located in practically any position on the felled tree. It is a further object to provide a power saw which may be operated in any position by a single workman.

Other objects and advantages of the invention will become apparent upon reference to the detailed description and accompanying drawings, in which:

Figure 1 is a side view of the improved saw in position for trimming a branch from a felled tree.

Fig. 2 shows in perspective the frame or cradle of the saw shown in Fig. 1.

Fig. 3 is a front view of the saw of Fig. 1 showing the manner in which it is supported on the side of a felled tree.

Fig. 4 is a view similar to Fig. 3 but showing the trimming of a branch on the upper surface of the trunk.

While only one embodiment of the invention has been described and shown in the drawing, it will be understood that the invention is susceptible of various modifications and alternative constructions. Therefore, we do not intend to limit ourselves to the single embodiment shown, but intend to cover all of the various modifications and alternatives falling within the spirit and scope of the appended claims.

Turning now to the drawing, the power driven saw embodying our improvement is indicated at 10 in Fig. 1. The saw includes a gasoline driven engine 11 which feeds power to an engine 11. Coupled to the head 12 is a power-driven chain 13 having a plurality of cutting teeth 14 arranged in the usual fashion. The chain is guided in the usual fashion by tracking it about a plate-like supporting member 13a to define a cutting plane, the supporting member 13a, as is conventional in this type of saw, being rigidly mounted in the head 12. The chain is driven in the direction indicated by the arrow 15 so that the saw tends to be drawn forwardly in use.

For the purpose of supporting the saw, a cradle or frame 16 is provided which, as shown in Fig. 2, is of generally U-shape terminating in a pair of handles 17, 18. The engine is connected to the cradle by means of a pair of laterally spaced clamps 21, 22 as well as by a bracket 23 at the forward end of the engine. The bracket 23 is, in the present device, welded to the frame 16 and connected to the engine by means of suitable bolts.

For lifting the saw, a handle 25 is formed integral with the head 12. Mounted on the frame or cradle 16 and straddling the engine 11 is a U-shaped bar 26 which not only protects the engine but serves to provide an additional hand-hold.

In accordance with the present invention, downwardly extending prongs are provided at the forward portion of the cradle or frame, the prongs being arranged symmetrically on each side of the cutting plane and angled forwardly to resist the pull of the saw chain. Further in accordance with the invention the prongs are located near the longitudinal balance point of the saw. In the present embodiment, the prongs, indicated at 31, 32 are welded or otherwise attached to the frame 16 at its forward corners, being braced against rearward movement by braces 33, 34 respectively and against lateral movement by braces 35, 36. Preferably, the braces 33—36 are anchored to the prongs near the tip, forming a tetrahedral support having a high degree of rigidity.

The prongs are sharpened so that they dig into the trunk or the tree during the trimming operation. The braces form the additional function of preventing the prongs from digging in too deeply in soft bark.

In practicing the invention, the prongs are angled laterally outward as shown in Fig. 3 so that the tips of the prongs extend beyond the boundaries of the engine and frame. This not only provides a more stable base when both prongs are engaged in the tree trunk, but also facilitates supporting the saw on the side of a felled trunk for the close trimming of branches.

The use of the saw for trimming is shown in Figs. 1 and 3. In these figures the tree trunk is indicated at 38 and has a laterally extending limb 39. To cut off the limb 39 close to the trunk, the saw is positioned as shown, with the prong 32 firmly planted in the bark on the side of the trunk. Since the prong 32 is located near the longitudinal center of gravity of the saw, it will be apparent that only a small amount of force need be exerted by the operator in order to maintain the saw in the position shown. The saw is then rocked so that the cutting chain engages the limb 39. Any tendency of the saw to be drawn toward the limb is overcome by the anchoring of the prong 32 which tends merely to dig in more firmly as the drag of the saw is increased. The saw chain is fed into the limb 39 simply by rocking the saw forwardly using the prong 32 as a fulcrum. The fact that the prong 32 extends beyond the boundaries of the frame provides clearance with respect to the tree trunk even though the saw is rocked through a large angle.

The saw may be used for trimming branches in any position, even where the branches extend upwardly as shown in Fig. 4. To to do this, the saw is oriented so that it lies partially on its side supported by the prong 32. The prong arrangement enables even downwardly angled branches to be cut with ease.

The prongs 31, 32 are of use not only in trimming a felled tree but also enable the saw to be more easily used for felling and bucking, providing a stable support for the saw even where the supporting surface is rough and irregular.

While the pronged support described above is practically universal in use and eliminates the need for special saws such as trimming saws, its primary utility lies in the saving in manpower. Conventional saws of this type require a two-man crew. By contrast, the present saw may be operated safely and rapidly by a single operator. Using the prongs, the function of the operator is simply to guide the saw and it is not necessary for him to support any substantial proportion of the weight. Because of the steadying effect of the prongs, vibration is sharply reduced. It has been found that saws constructed as shown in the drawing may be operated for long periods of time without operator fatigue.

We claim as our invention:

1. In a power chain saw, the combination comprising an engine, a plate-like chain-supporting member extending forwardly from the engine and rigidly coupled thereto, a supporting frame for said power chain saw including a pair of longitudinal members at the sides of said engine for rigidly engaging the same, said members having rear portions terminating respectively in a pair of rearwardly extending handles, a pair of downwardly projecting prongs at the respective forward portions of said longitudinal members, said prongs being offset laterally from the chain and symmetrically arranged with respect thereto, said prongs being located in the region of the balance point of the power chain saw to enable forward rocking movement of the saw into engagement with the work about at least one of said prongs as a fulcrum.

2. For use with a power chain saw of the type having an engine and having a chain-supporting member extending forwardly from the engine and rigidly coupled thereto, the subcombination comprising a supporting frame having longitudinal members for rigid connection to said engine, a pair of rearwardly extending handles laterally spaced at the rear of said frame, a pair of downwardly projecting prongs at the forward portion of said frame, said prongs being angled forwardly as well as laterally outward from said frame so that the tips of each of them project unobstructedly beyond the lateral boundaries of the frame and engine, said handles and said prongs being offset laterally in opposite directions from the cutting plane of the chain and symmetrically oriented with respect thereto, said prongs being located in the region of the balance point of the power chain saw for bodily rocking of the saw into engagement with the work about at least one of said prongs as a fulcrum.

References Cited in the file of this patent
UNITED STATES PATENTS

| | | |
|---|---|---|
| 1,979,001 | Kanpos | Oct. 30, 1934 |
| 2,256,786 | Fritz | Sept. 23, 1941 |

FOREIGN PATENTS

| | | |
|---|---|---|
| 328,527 | Great Britain | May 1, 1930 |
| 508,286 | Germany | Sept. 26, 1930 |